United States Patent
Langille

(10) Patent No.: US 9,826,272 B2
(45) Date of Patent: Nov. 21, 2017

(54) REMOTE MODE SELECTION FOR A SET-TOP BOX

(71) Applicant: EchoStar Technologies L.L.C., Englewood, CO (US)

(72) Inventor: Gary R. Langille, Lone Tree, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

(21) Appl. No.: 14/518,199

(22) Filed: Oct. 20, 2014

(65) Prior Publication Data

US 2016/0112758 A1    Apr. 21, 2016

(51) Int. Cl.
*H04N 21/443* (2011.01)
*H04N 21/422* (2011.01)
*H04N 21/45* (2011.01)

(52) U.S. Cl.
CPC ... *H04N 21/4432* (2013.01); *H04N 21/42221* (2013.01); *H04N 21/42222* (2013.01); *H04N 21/4436* (2013.01); *H04N 21/4508* (2013.01)

(58) Field of Classification Search
CPC .......... H04N 21/4432; H04N 21/4436; H04N 21/42221; H04N 21/4227; H04N 21/4508; H04N 21/458; H04N 21/42222
See application file for complete search history.

(56) References Cited

U.S. PATENT DOCUMENTS

| | | | | |
|---|---|---|---|---|
| 9,024,894 B1* | 5/2015 | Smith | .................. | H04N 21/422 725/39 |
| 2010/0013551 A1* | 1/2010 | Reams | ............... | H04N 21/4436 327/544 |
| 2010/0115117 A1* | 5/2010 | Diab | ....................... | H04L 12/12 709/230 |
| 2011/0150431 A1* | 6/2011 | Klappert | ............ | H04N 21/4432 386/296 |
| 2012/0005632 A1* | 1/2012 | Broyles, III | ............ | G06F 3/017 715/863 |
| 2012/0226981 A1* | 9/2012 | Clavin | .................... | G06F 3/005 715/719 |
| 2013/0039531 A1* | 2/2013 | Basso | ..................... | G06F 3/017 382/103 |
| 2014/0129859 A1* | 5/2014 | O'Malley | ............. | G06F 1/3209 713/323 |
| 2014/0198697 A1* | 7/2014 | Jeanne | ............... | H04N 21/4436 370/311 |

* cited by examiner

*Primary Examiner* — Pankaj Kumar
*Assistant Examiner* — Alexander Boyd
(74) *Attorney, Agent, or Firm* — Bejin Bieneman PLC

(57) ABSTRACT

A system includes a set-top box and a remote device. The remote device receives data representing an event from the set-top box. The remote device determines whether the event has occurred based on the data representing the event and generates a transition command to transition the set-top box from a first operating mode to a second operating mode. Further, the remote device transmits the transition command to the set-top box if the event has occurred.

17 Claims, 3 Drawing Sheets

REMOTE MODE SELECTION FOR A SET-TOP BOX

BACKGROUND

To reduce power consumption, set-top boxes must meet increasingly stringent low-power requirements when operating in low-power modes. It is necessary, due to the increasing size and quiescent state leakage currents of System-on-Chip devices found in set-top boxes, to turn off large sections of these devices in low-power modes. To "wake-up" the set-top box from a low-power mode, specialized, independent circuits are required in the set-top box that operate at very low power and provide schedule functions such as a wake-up function to the set-top box. These independent circuits wake-up the more power consuming System-on-Chip used to perform video recordings, system maintenance, or resume a "quick-start" standby mode. These independent circuits, however, add cost and increase the quiescent power requirements of the set-top box.

DETAILED DESCRIPTION

With reference to the Figures, where like numerals indicate like parts throughout the several views, a system 10 includes a set-top box 100 and a remote device 200. The remote device 200 is configured to receive data representing an event from the set-top box 100. The remote device 200 is configured to determine whether the event has occurred based on the data representing the event and to generate a transition command to transition the set-top box 100 from a first mode to a second mode. The remote device 200 is further configured to transmit the transition command to the set-top box 100 if the event has occurred. The set-top box 100 is configured to transition from the first mode (e.g., a low-power mode) to the second mode (e.g., an active or high-power mode) in response to receiving the transition command from the remote device 200.

This system has the advantage that the set-top box 100 may be placed in a low-power mode such as standby mode or sleep mode, and the remote device 200 can assume the function of monitoring a schedule for the set-top box 100. That is, the remote device can monitor when the set-top box 100 is required to perform an operation. For example, the set-top box 100 may send data to remote device 200 that the set-top box 100 must record a user-selected program at a predetermined time. The set-top box 100 then enters the low-power mode and waits to receive the transition command from the remote device 200. The low-power mode may be, for example, a sleep mode or a standby mode.

The remote device 200 may be programmed to monitor the schedule for the set-top box 100. Upon determining that the predetermined time has been reached, the remote device 200 transmits a transition command to the set-top box 100. Based on the transition command, the set-top box 100 transitions from the first mode (e.g. the low-power mode) to the second mode (e.g. an active mode). The active mode may be, for example, a mode wherein the set-top box 100 is recording a user-selected program, downloading a program schedule, updating software, performing maintenance functions, etc. In this manner, a dedicated wake-up circuit for the set-top box 100 can be reduced or simplified, reducing cost and reducing a current consumption of the set-top box in low-power modes.

Figure 1:
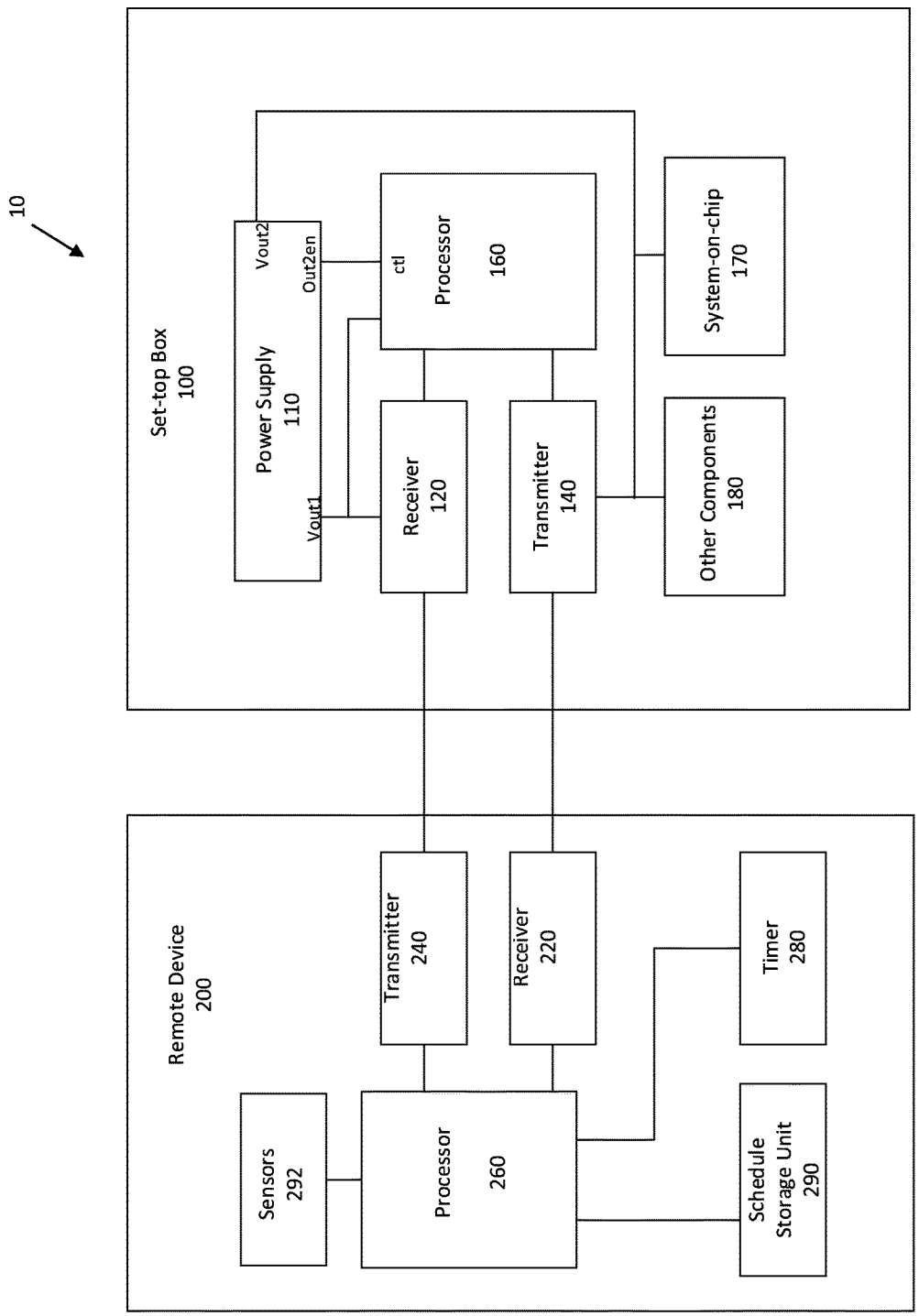
FIG. 1 is block diagram of a system including a remote device and a set-top box in two-way communication.

As shown in FIG. 1, the remote device 200 includes a remote device receiver 220 configured to receive the data representing the event from the set-top box 100, a remote device transmitter 240 configured to transmit commands to the set-top box 100 and sensors 292. The remote device further includes a remote device processor 260 in communication with the remote device receiver 220 and remote device transmitter 240. The remote device processor 260 may be programmed to determine that the event has occurred based on the data representing the event. If the event has occurred the remote device processor 260 is programmed to generate the transition command to transition the set-top box 100 from the first operating mode to the second operating mode. The transmitter 240 is configured to transmit the transition command to the set-top box 100.

The remote device receiver 220 is configured to receive data from the set-top box 100 and to transfer data received from the set-top box 100 to the remote device processor 260. The remote device receiver 220 may be configured to communicate using a wireless communication protocol. Accordingly, the remote device receiver 220 may include, e.g., an infrared receiver, an RF receiver, etc.

The remote device transmitter 240 is configured to receive commands from the remote device processor 260 and to transmit the commands to the set-top box 100. The remote device transmitter 240 may be configured to communicate using a wireless communication protocol. Accordingly, the remote device transmitter 240 may include, e.g., an infrared transmitter, an RF transmitter, etc.

The remote device processor 260 may be a microcontroller, a computer, a digital logic array, an embedded controller, a digital logic array or any other form of electronic circuit which can receive input data, signals and commands, make decisions based on the input data, signals and/or commands, and provide output data, signals and/or commands. The remote device processor 260 may be configured to receive data from the remote device receiver 220, to store the data received from the remote device receiver 220, to generate commands for the set-top box 100, and send the commands to the remote device transmitter 240 for transmission to the set-top box 100. The commands may include sleep commands, transition commands, other suitable commands, instructions, or data.

The sensors 292 may include proximity sensors, motion sensors, biological sensors, etc. The sensors 292 may be in communication with the remote device processor 260. For example, a motion sensor 292 may detect a presence of a user, and send a signal the remote device processor 260 that a user is nearby.

The set-top box 100 includes a power supply 110, a set-top box receiver 120, a set-top box transmitter 140 and a set-top box processor 160. The set-top box receiver 120 and set-top box transmitter 140 are each in communication with the set-top box processor 160. The set-top 100 box may further include a system-on-chip 170 and other components 180.

The power supply 110 provides power to the other sections of the set-top box 100. The power supply 110 may have a plurality of outputs. For example, the power supply may have a first output Vout1 that is continuously active. This output may be used, for example, to supply the set-top box receiver 120 and the set-top box processor 160. In addition, the power supply 110 may have a second output Vout2 that is switchable according to a control signal Out2en, received from the set-top box processor 160. Vout2 may supply power for the set-top box transmitter 140, the system-on-chip 170 and the other components 180. In this manner, the set-top box processor 160 may, via the control signal Out2en, turn off those sections of the set-top box 100 that are not required during low power operation. Additional segmentation of the power supply 110 is possible.

The set-top box receiver 120 is configured to receive commands from the remote device transmitter 240 and input those commands to the set-top box processor 160. The set-top box receiver 120 may be configured to communicate using a wireless communication protocol. Accordingly, the set-top box receiver 120 may include, e.g., an infrared receiver, an RF receiver, etc.

The set-top box transmitter 140 is configured to receive data from the set-top box processor 160 and transmit the data to the remote device receiver 220. The set-top box transmitter 140 may be configured to communicate using a wireless communication protocol. Accordingly, the set-top box transmitter 140 may include, e.g., an infrared transmitter, an RF transmitter, etc.

The set-top box 100 further includes a set-top box processor 160. The set-top box processor 160 is configured to determine data representing events and transmit the data to the remote device 200 via the set-top box transmitter 140. The set-top box processor 160 is further configured to receive commands from the remote device 200 via the set-top box receiver 120 and transition the set-top box 100 between operating modes based on the commands received from the remote device 200. The set-top box processor 160 may be a microcontroller, a computer, a digital logic array, an embedded controller, a digital logic array or any other form of electronic circuit which can receive input data, signals and commands, make decisions based on the input data, signals and commands, and provide output data, signals and commands.

The system-on-chip 170 may control and execute many of the primary functions of the set-top box 100 such as recording and playing user-selected programs, managing the storing of programs, downloading and displaying of user guides, etc.

The other components 180 of the set-top box may include HDDs, RF Content Signal Receivers (Sat, Cable or IP), TV signal output transmitters (HDMI), etc.

The set-top box 100 may for example transmit event schedule information, such as when the set-top box 100 is scheduled to record user selected programs, when the set-top box 100 is scheduled to receive software updates, when the set-top box 100 is scheduled to receive updated program guide information, etc. The set-top box 100 may transmit mode transition data representing the event. The transition data may include, for example, that upon occurrence of the event, the set-top box 100 should be instructed to transition from the first mode to the second mode, the first and second modes being operating modes. Operating modes for the set-top box may include low-power mode, sleep mode, standby mode, OFF mode, active mode, ON mode, record mode, play mode, maintenance mode, debug mode, programming mode, etc. In the alternative, the mode transition data may be restricted to only power state transition information, e.g., power ON or power OFF.

The first mode may be the low-power mode. In this case, as discussed above, the remote device 200 may assume the function of monitoring when the set-top box 100 is required to transition, for example, to the record mode in order to record the user-selected program.

The remote device processor 260 may be programmed to determine an event schedule time for the event based on the data representing the event. The data representing the event may include a first time, the first time being a target time for the set-top box 100 to operate in the second mode. The data representing the event may further include a second time, the second time being a predetermined time that the set-top box 100 needs to transition from the first mode to the second mode, after receiving the transition command. The remote device processor 260, may determine the event schedule time by reading the first (target) time, reading the second (set-up) time, and setting the event schedule time to be earlier than the first (target) time by an amount equal to the second (set-up) time.

As another example, the set-top box 100 may pre-calculate the event schedule time based on the first (target) time and the second (set-up) time and transmit the event schedule time directly to the remote device 200. The second (set-up) time may vary depending on the mode transition requested. For example, the second time for transitioning from OFF to low power mode may be 2 mS, and the second time for transitioning from standby mode to ON may be 0.2 S.

The processor 260 may determine that the event has occurred based on a comparison of a reference time to the event schedule time for the event. The event schedule time may be a target date and target time-of-day. The reference time may be the date and time-of-day. In this case, the processor may determine that the event has occurred when the reference time equals the event schedule time. For example, the remote device 200 could receive a time signal transmitted by the United States National Institute of Standards and Technology (NIST) or another standard time-keeping entity. The remote device 200 may determine the reference time based on the time signal received from the standard time-keeping entity. The remote device 200 may determine that the event has occurred when the reference time equals the event schedule time. The remote device 200 may receive the reference time from any suitable source, and in any suitable form.

The remote device 200 may include a timer 280 to generate the reference time. The timer 280 may have, for example, a calendar and clock function, and output a signal containing the date and time. The processor 260 may determine that the event has occurred when the date and time as output from the timer 280 is equal to the event schedule time. As another example, the event schedule time could be an elapsed amount of time since the set-top box 100 entered the low-power mode. The timer 280 could start running at a start time when the set-top box enters the low-power mode. The processor 260 may determine that the event has occurred when the timer 280 reaches a measured elapsed time equal to the event schedule time.

The remote device 200 may include a schedule storage unit 290. The remote device 200 may, upon receiving the data representing the event, store the data in the schedule storage unit 290. The schedule storage unit 290 may be in communication with the remote device processor 260. When the remote device processor 260 receives data from the set-top box 100 as described above, the device processor 260 may store the data in schedule storage unit 290. The schedule storage unit 290 may be any storage medium, e.g., RAM, ROM, non-volatile memory, a hard drive, a magnetic tape, a floppy disc, etc. The storage unit 290 may be a separate component of the remote device 200, or embedded within the processor 260, or embedded within another component of the remote device 200. Further, the schedule storage unit 290 may be a separate component from the remote device 200, in communication with the remote device 200.

The remote device processor 260 may determine whether the event has occurred based on the data representing the event stored in the schedule storage unit 290. For example, the data stored in the data storage unit 290 may include the first time and the second time as described above. The remote device processor 260 may read or retrieve the data stored in the data storage unit 290 and determine the first time and the second time from the data stored in the data storage unit 290. The remote device processor 260 may then determine an event schedule time based on the first time and the second time and may determine if the event has occurred, by comparing the reference time to the event schedule time, as described above.

The remote device 200, may, upon receiving the data representing the event, transmit, e.g., a first mode command to the set-top box 100 to command the set-top box 100 to transition to the first mode. The first mode may be, for example, the low-power mode. The set-top box 100 may, in preparation for entering the low-power mode, transmit data representing the event to the remote device 200. The remote device 200, may, upon receiving the data representing the event, transmit the first mode command to the set-top box 100, commanding the set-top box 100 to transition to the first mode. Then, upon determining at a later time that, for example, the reference time is equal to the event schedule time, the remote device 200 may transmit the transition command to the set-top box 100, as described above.

The remote device 200 may also make an independent determination to send a transition command. For example, based on signals from the sensors 292, the remote device processor 260 may determine the presence of a user nearby. Based on this determination, the remote device 200 may initiate a transition of the set-top box from OFF to a "quick-start" standby mode so the set-top box 100 can respond more quickly to an initial user input.

Figure 2:
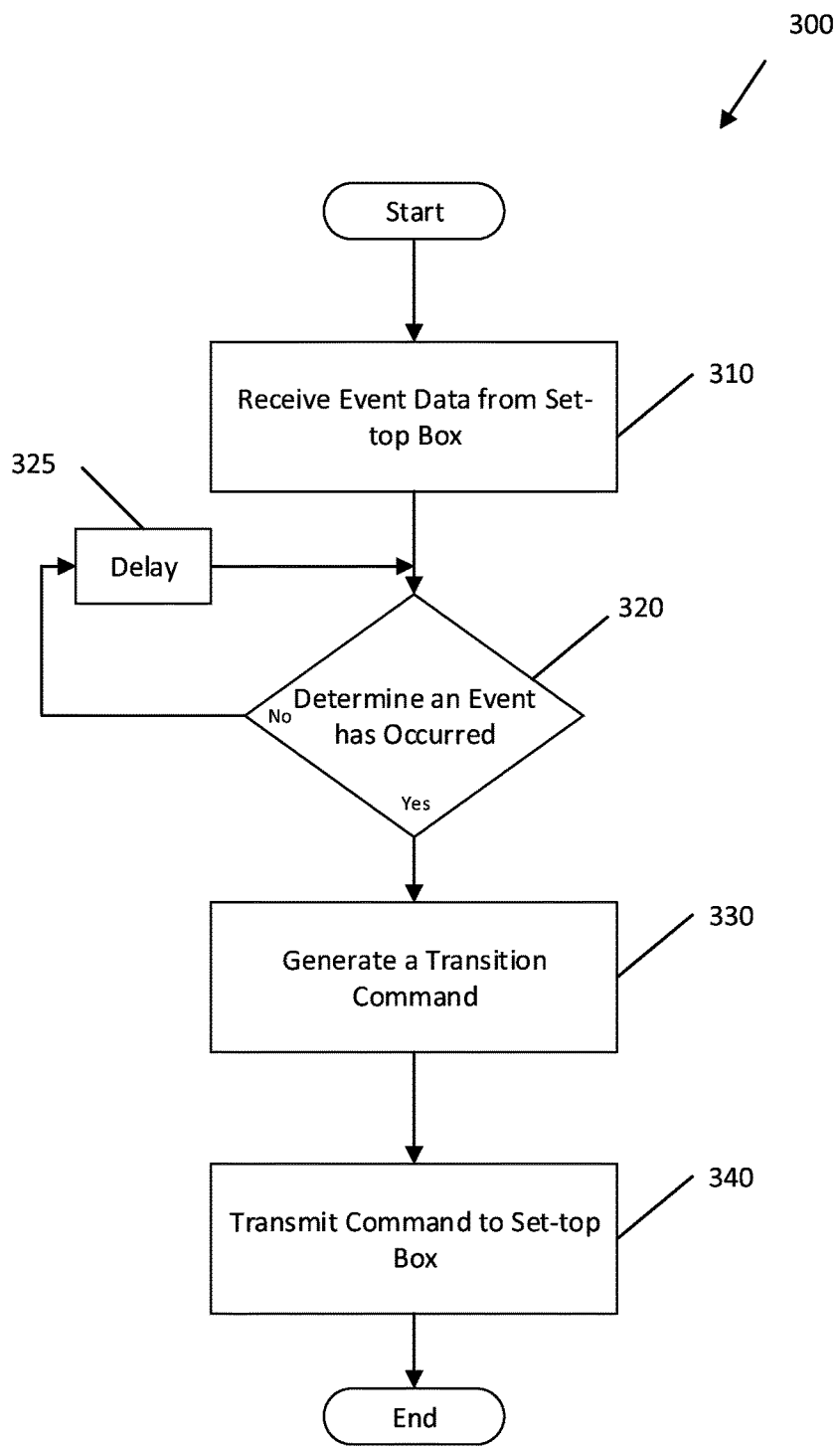
FIG. 2 is a process flow chart for a remote device sending a transition command to the set-top box upon the occurrence of an event.

FIG. 2 is a process flow diagram for process 300. The process may be executed by the remote device 200 to transition the set-top box 100 from a low-power mode to an active mode. The process may start upon receipt of data from the set-top box 100.

Block 310 includes receiving data representing the event from the set-top box 100. The data may, for example, be received by the remote device receiver 220 of the remote device 200. The remote device receiver 220 may communicate the data to the remote device processor 260. The data may include, for example, the first time and the second time as described above.

Block 320 includes determining if the event has occurred. For example, the remote device processor 260 may determine, based on the first time and the second time, the event schedule time. The remote device processor 260 may further determine that the event has occurred by comparing the reference time to the event schedule time. If the remote device processor 260 determines that the event has occurred, the remote device processor 260 proceeds to Block 330. If the remote device processor 260 determines that an event has not occurred, the remote device processor 260 proceeds to Block 325.

Block 325 represents a time delay. The time delay may be a result of synchronous clock based operation of the remote device processor 260. The time delay may be an intentional wait time introduced into the process 300. Following the delay of Block 325, the remote device processor 260 returns to Block 320.

Block 330 includes generating the transition command for the set-top box 100 to transition from the first mode to the second mode. For example, the remote device processor 260 may generate the command. The transition command may be an instruction for the set-top box 100 to transition from the low-power mode to the active mode. The active mode may be, for example, the recording mode.

Block 340 includes transmitting the command to the set-top box 100. For example, upon generating the transition command, the remote device processor 260 may communicate the transition command to the remote device transmitter 240. The remote device transmitter may transmit the transition command to the set-top box 100.

The process may end after block 340.

Figure 3:
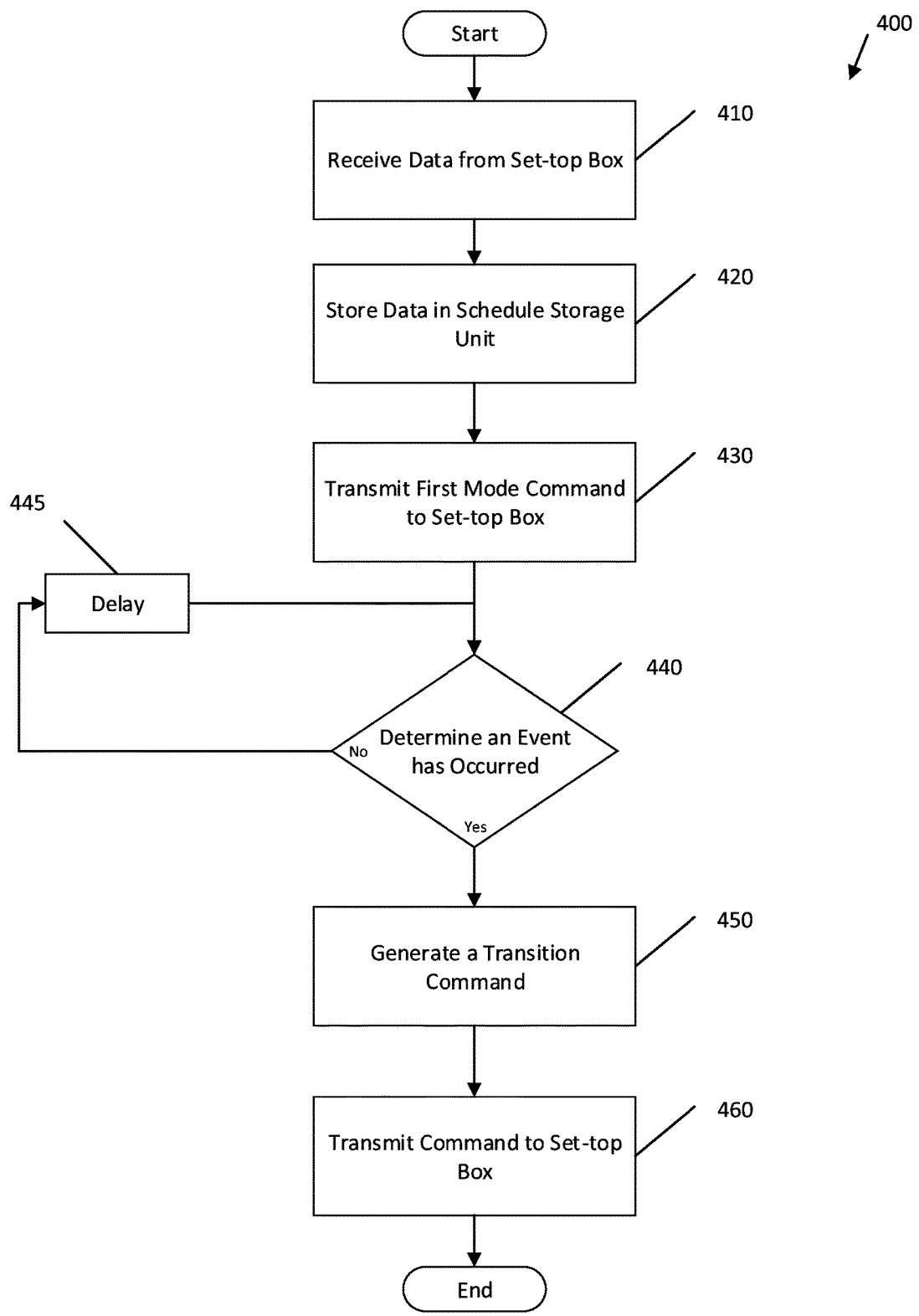
FIG. 3 is a process flow chart for a remote device sending a first mode command upon receiving data from the set-top box, and sending the transition command to the set-top box upon the occurrence of an event.

FIG. 3 is a process flow diagram for process 400. The process may be executed by the remote device 200 to transition the set-top box 100 to a low-power mode upon receipt of data from the set-top box 100 and to transition the set-top box from a low-power mode to an active mode upon determining an event.

Block 410 includes receiving data representing the event from the set-top box 100. The data may, for example, be received by the remote device receiver 220 of the remote device 200. The remote device receiver 220 may communicate the data to the remote device processor 260. The data may include, for example, the first time and the second time as described above.

Block 420 includes storing the data in the schedule storage unit 290. The remote device processor 260, upon receiving the data from the remote device receiver 220, may store the data in the schedule storage unit 290, as described above.

Block 430 includes transmitting the first mode command to the set-top box 100. The remote device processor 260 may generate the first mode command, and communicate the first mode command to the remote device transmitter 240. The remote device transmitter 240 may transmit the first mode command to the set-top box 100. The first mode may be, for example, the low-power mode. The set-top box 100 may, in response to the first mode command, transition to the first mode.

Block 440 includes determining if the event has occurred. For example, the remote device processor 260 may determine, based on the first time and the second time, the event schedule time. The remote device processor 260 may further determine that the event has occurred based by comparing the reference time to the event schedule time. If the remote device processor 260 determines that the event has occurred, the remote device processor 260 proceeds to Block 450. If the remote device processor 260 determines that an event has not occurred, the remote device processor 260 proceeds to Block 445.

Block 445 represents a time delay. The time delay may be a result of synchronous clock based operation of the remote device processor 260. The time delay may be an intention wait time introduced into the process 400. Following the delay of Block 445, the remote device processor 260 returns to Block 440.

Block 450 includes generating the transition command for the set-top box 100 to transition from the first mode to the second mode. For example, the remote device processor 260 may generate the command. The transition command may be an instruction for the set-top box 100 to transition from the low-power mode to the active mode. The active mode may be, for example, the recording mode.

Step 460 includes transmitting the transition command to the set-top box 100. For example, upon generating the transition command, the remote device processor 260 may communicate the transition command to the remote device transmitter 240. The remote device transmitter 240 may transmit the transition command to the set-top box 100.

The process may end after block 460.

In the drawings, the same reference numbers indicate the same elements. Further, some or all of these elements could be changed. Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

The invention claimed is:

1. A remote device for controlling operations of a set-top box via infrared communications comprising:
    a sensor;
    an infrared receiver configured to receive communications from the set-top box;
    an infrared transmitter configured to transmit communications to the set-top box;
    a processor and a memory, the memory storing instructions such that the processor is programmed to:
    detect at least one event based on data received via the infrared receiver from the set-top box;
    generate a first single transition command that includes an instruction to transition the set-top box from a first mode, the first mode being a low power mode, to a second mode selected from a plurality of second modes, the second mode being an active mode, wherein the instruction specifies the second mode;
    detect, based on an input from the sensor, prior to detecting the event, and without input from a user, a person;
    generate a second transition command based at least in part on the detection of the person; the transition command including instructions for the set-top box to transition from an OFF mode to a standby mode, wherein the standby mode supports a quicker response to an initial user input relative to the OFF mode; and
    instruct the infrared transmitter to transmit the second transition command to the set-top box.

2. The remote device of claim 1, wherein the processor is further programmed to:
    determine an event schedule time for the at least one event based on the data received from the set-top box; and
    instruct the infrared transmitter to transmit the first transition command to the set-top box.

3. The remote device of claim 2, wherein the processor is programmed to determine that the at least one event has occurred by comparing a reference time to the event schedule time for the at least one event.

4. The remote device of claim 3 further comprising a timer configured to generate the reference time.

5. The remote device of claim 3, wherein the reference time is a time-of-day.

6. The remote device of claim 2 wherein the data received from the set-top box includes a first time representing a target time for the set-top box to operate in the second mode.

7. The remote device of claim 6 wherein the data received from the set-top box further includes a second time representing a predetermined amount of time that the set-top box needs to transition from the first mode to the second mode after receiving the command.

8. The remote device of claim 2 further comprising a schedule storage unit configured to store data representing the at least one event.

9. The remote device of claim 8, wherein the processor determines whether the at least one event has occurred based on the data stored in the schedule storage unit.

10. The remote device of claim 8, wherein upon receiving the data representing the at least one event, the remote device transmitter transmits a first mode command to the set-top box to transition the set-top box to the first mode.

11. A method comprising:
    receiving, by a processor in a remote device, via an infrared receiver in the remote device, data from a set-top box;
    detecting, by the processor in the remote device, at least one event based on the data received via the infrared receiver in the remote device, from the set-top box;
    generating a single first command that includes an instruction to transition a set-top box from a first mode, the first mode being a low power mode, to a second mode selected from a plurality of second modes, the second mode being an active mode, wherein the instruction specifies the second mode;
    detecting, based on an input from a sensor included in the remote device, prior to detecting the event, and without input from a user, a person;
    generate a second transition command based at least in part on the detection of the person; the transition command including instructions for the set-top box to transition from an OFF mode to a standby mode, wherein the standby mode supports a quicker response to an initial user input relative to the OFF mode; and
    instructing an infrared transmitter in the remote device to transmit the second transition command to the set-top box.

12. The method of claim 11, further comprising:
    determining an event schedule time for the at least one event based on the data received from the set-top box; and
    instructing the infrared transmitter to transmit the first transition command to the set-top box.

13. The method of claim 12, wherein determining whether the at least one event has occurred is based on the event schedule time for the at least one event.

14. The method of claim 13, wherein determining that the at least one event has occurred includes comparing a reference time to the event schedule time for the at least one event.

15. The method of claim 14, wherein the reference time is a time-of-day.

16. The method of claim 11, further comprising:
    transmitting a command for the set-top box to transition to the first mode upon receiving the data received from the set-top box.

17. A system comprising:
    a remote device comprising:
        a sensor;

an infrared receiver configured to receive communications from a set-top box;
an infrared transmitter configured to transmit communications to the set-top box;
a processor and a memory, the memory storing instructions such that the processor is programmed to:
   detect at least one event based on data received via the infrared receiver from the set-top box;
   generate a single first transition command that includes an instruction to transition the set-top box from a first mode, the first mode being a low power mode, to a second mode selected from a plurality of second modes, the second mode being an active mode, wherein the instruction specifies the second mode;
   detect, based on an input from the sensor, prior to detecting the event, and without input from a user, a person;
   generate a second transition command based at least in part on the detection of the person; the transition command including instructions for the set-top box to transition from an OFF mode to a standby mode, wherein the standby mode supports a quicker response to an initial user input relative to the OFF mode; and
   instruct the infrared transmitter to transmit the second transition command to the set-top box; and
further comprising:
the set-top box comprising a second processor and a second memory, the second memory storing instructions such that the second processor is programmed to:
   receive the second transition command; and
   transition from the OFF mode to the standby mode based at least in part on the second transition command.

* * * * *